(12) United States Patent
Logue et al.

(10) Patent No.: US 12,195,188 B2
(45) Date of Patent: Jan. 14, 2025

(54) AIRCRAFT CEILING RESETTABLE DECOMPRESSION ROLLER ASSEMBLY

(71) Applicant: The Boeing Company, Chicago, IL (US)

(72) Inventors: Adam Arthur Logue, Everett, WA (US); Robert B. Fowler, Everett, WA (US); Todd Douglas Smith, Arlington, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 17/808,458

(22) Filed: Jun. 23, 2022

(65) Prior Publication Data

US 2023/0415899 A1     Dec. 28, 2023

(51) Int. Cl.
*B64D 13/02* (2006.01)
*B64C 1/12* (2006.01)

(52) U.S. Cl.
CPC ............... *B64D 13/02* (2013.01); *B64C 1/12* (2013.01)

(58) Field of Classification Search
CPC ............................ B64C 2001/009; B64C 1/14
See application file for complete search history.

(56) References Cited

U.S. PATENT DOCUMENTS

| 4,045,063 | A | 8/1977 | Fletcher et al. |
| 5,782,511 | A | 7/1998 | Schwarz |
| 7,533,911 | B2 * | 5/2009 | Homner ................ E05B 51/023 |
| | | | 244/129.4 |
| 7,770,942 | B2 | 8/2010 | Homner |
| 8,608,213 | B2 | 12/2013 | Homner |
| 8,740,147 | B2 * | 6/2014 | Defrance ............... B64D 29/06 |
| | | | 244/129.4 |
| 10,435,929 | B2 | 10/2019 | Do |
| 10,604,977 | B2 | 3/2020 | Do |
| 2003/0146629 | A1 | 8/2003 | Cheever |
| 2013/0292069 | A1 * | 11/2013 | Clos .................... B64D 11/0023 |
| | | | 160/405 |
| 2019/0309548 | A1 | 10/2019 | LaConte et al. |
| 2021/0291954 | A1 | 9/2021 | Antoine et al. |

FOREIGN PATENT DOCUMENTS

DE     202008009371 U1    2/2009
DE        10040410 B4    6/2009

* cited by examiner

*Primary Examiner* — Philip J Bonzell
*Assistant Examiner* — Eric Acosta
(74) *Attorney, Agent, or Firm* — Yee & Associates, P.C.

(57) ABSTRACT

A system and method for relieving pressure from a passenger cabin of an aircraft during a decompression event with a resettable decompression system. The system includes a resettable decompression retainer having a swing arm pivotably connected to a base. The swing arm has a bias relative to the base provided by a spring connected to both the swing arm and the base. The swing arm engages a slip fitting that is attached to a ceiling panel of the aircraft. The resettable decompression system allows the ceiling panel to move thus allowing air pressures between a passenger cabin and a crown space to equalize. After a decompression event, the resettable decompression retainer can be manually reset without the use of tools and without repairing or replacing the resettable decompression retainer.

20 Claims, 16 Drawing Sheets

AIRCRAFT CEILING RESETTABLE DECOMPRESSION ROLLER ASSEMBLY

BACKGROUND INFORMATION

1. Field

The present disclosure relates generally to decompression of aircraft passenger cabins. More specifically, the present disclosure relates to a resettable decompression retainer for releasable attachment of ceiling panels to aircraft structures.

2. Background

Passenger cabins of aircraft, especially commercial aircraft, commonly include ceiling panels, which among other purposes, provide an attractive, finished appearance to the passengers seated in the passenger cabin. The ceiling panels separate the passenger cabin from a crown space or other compartments above the passenger cabin where aircraft structure and other aircraft systems may be located. Ceiling retainers and other attachment hardware are used to attach the ceiling panels to aircraft structures. Ceiling retainers have an open position and a closed position. Typically, during normal operation of the aircraft, the ceiling retainers are in the closed position and the attached ceiling panel presents an aesthetic barrier between the passenger cabin and the crown space. In the event of decompression in the crown space, air pressure acting on the ceiling panel forces the ceiling panel upward and causes the ceiling retainers to move from the closed position to the open position. When the ceiling panel pivots and the ceiling retainers move to the open position, an opening between the passenger cabin and the crown space is created to allow the pressure between the passenger cabin and the crown space to equalize.

The ceiling retainers are set to open at a particular load level to allow the ceiling panel to move. If, during a decompression event, the decompression load on the ceiling retainer exceeds a particular level, the ceiling retainer will open and allow the attached ceiling panel to move upward and thus stabilize the pressure difference. Typical ceiling retainers in use today incorporate frangible links that break when the decompression load exceeds the particular level. The frangible links are used up after a single event and render the ceiling retainer inoperable until the ceiling retainer or the frangible links can be replaced. Additionally, during initial installation of the ceiling panels or during maintenance performed in the passenger cabin area or the crown space, the ceiling panel or the retainer may get bumped resulting in the frangible links of the ceiling retainer breaking. Replacing the ceiling retainers or repairing the frangible links is time consuming and costly.

Therefore, it would be desirable to have a method and apparatus that takes into account at least some of the issues discussed above, as well as other possible issues.

SUMMARY

An illustrative embodiment of the present disclosure provides a resettable decompression retainer comprising a base and a swing arm. The swing arm is connected to the base and the swing arm is pivotable with respect to the base about an axis. A surface of the swing arm abuts a stop formed in the base when the swing arm is in a closed position. The swing arm has a bias relative to the base. The swing arm has an over-center position and an open position and the bias moves the swing arm into the closed position when the swing arm is positioned between the over-center position and the closed position.

Another illustrative embodiment of the present disclosure provides a resettable decompression system for relieving pressure in an aircraft passenger cabin during a decompression event. A panel separates a crown space of an aircraft from the aircraft passenger cabin. A slip fitting is attached to the panel and the slip fitting has a slot. A resettable decompression retainer is attached to a structure of the aircraft. The resettable decompression retainer has a base pivotally connected to a swing arm. The swing arm has a bias that biases the swing arm relative to the base. The swing arm has a closed position, an over-center position, and an open position relative to the base. The bias forces the swing arm to the closed position when the swing arm is between the closed position and the over-center position and the bias forces the swing arm to the open position when the swing arm is between the over-center position and the open position. A roller formed in the swing arm is slidably engaged with the slot.

A further illustrative embodiment of the present disclosure provides a method for relieving pressure from a passenger cabin of an aircraft during a decompression event, the method. The method includes a step of attaching a resettable decompression retainer to a structure of the aircraft. The resettable decompression retainer has a base configured to be attached to the structure of the aircraft and a swing arm pivotably connected to the base. The swing arm has a bias relative to the base. The method includes a step of attaching a slip fitting to a panel of the aircraft. The slip fitting has a slot and the panel separates the passenger cabin from a crown space of the aircraft. The swing arm is slidably engaged with the slot. In response to a force applied to the resettable decompression retainer, the method includes a step of rotating the swing arm relative to the base against the bias to an open position as the swing arm moves through the slot if the force applied to the resettable decompression retainer is greater than the bias.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account a typical ceiling retainer load is set above any abuse loads a retainer would typically see during installation, service, or day-to-day use to preserve the life of the ceiling retainer which diminishes the effectiveness of the ceiling retainer in certain situations, for example decompression events.

The illustrative embodiments recognize and take into account that typical ceiling retainers currently in use include frangible links that require replacement after a single event such as a decompression event or an accidental trip of the ceiling retainer during maintenance or installation.

The illustrative embodiments also recognize and take into account that after a decompression event or accidental trip of a typical ceiling retainer, tools are required to replace broken frangible links of the ceiling retainer or replacement of the entire ceiling retainer in order to make the ceiling retainer operable again causing the aircraft to be taken out of service for periods of time.

Thus, the illustrative embodiments provide a resettable decompression retainer and roller assembly that allows for a retainer load that is set lower than typical ceiling retainers having frangible links. Thus, the illustrative embodiments provide a resettable decompression retainer that is more effective in more situations. The illustrative embodiments provide a resettable decompression retainer that can be reset by hand back into operational position after an event without having to be replaced and without the use of tools and frangible parts.

The illustrative embodiments provide a resettable decompression retainer that accomplishes at least two functions, hold the ceiling panel closed and allow the ceiling panel to move upward under a decompression load in order to stabilize pressures between two separated compartments like a passenger cabin and a crown space of an aircraft.

Figure 1:
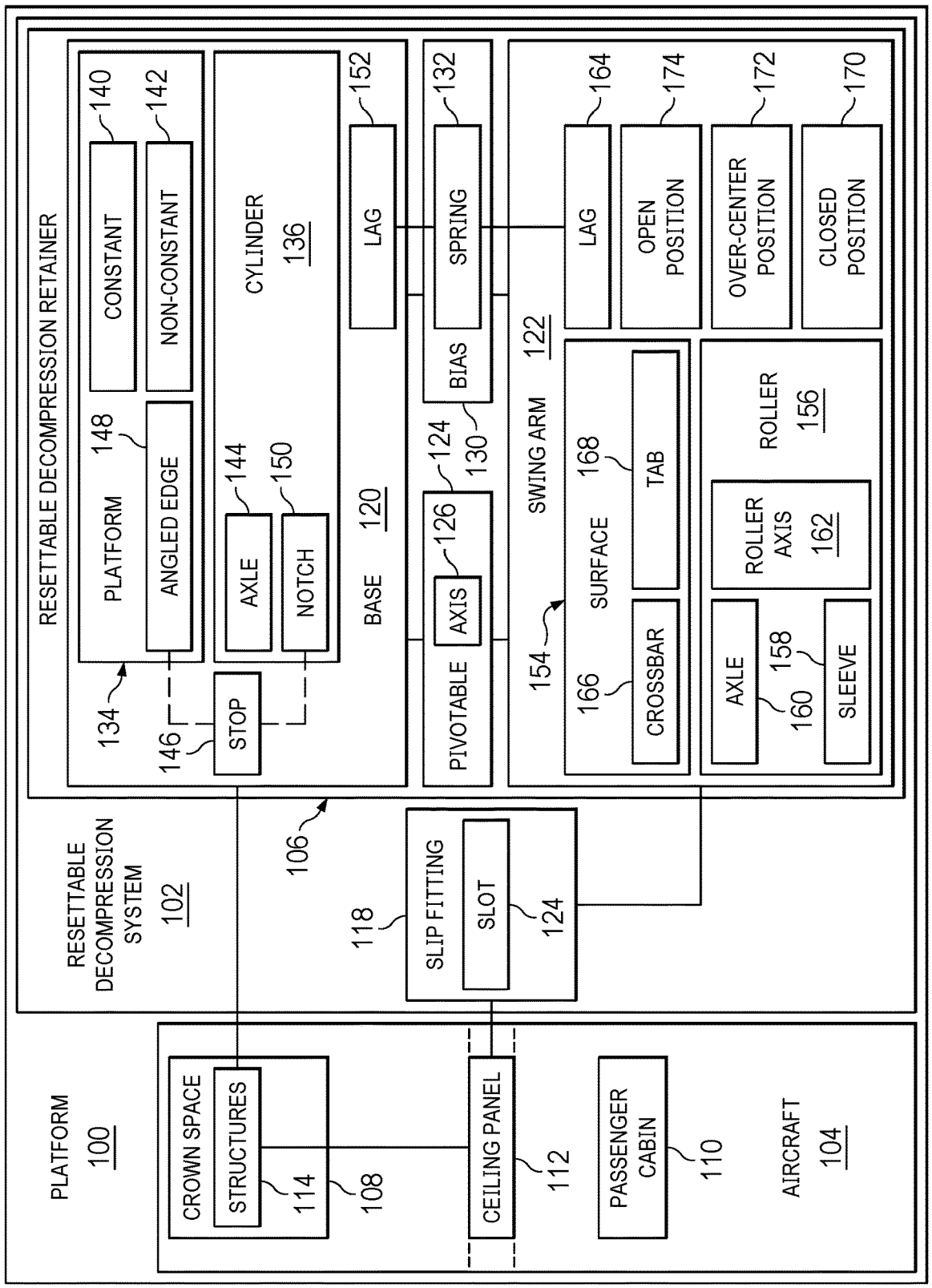
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative embodiment. Platform 100 has resettable decompression system 102 and aircraft 104 in this illustrative example.

Platform 100 may take a variety of different forms. For example, without limitation, platform 100 may be implemented in a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where resettable decompression system is desirable.

In this illustrative example, platform 100 takes the form of aircraft 104. In this illustrative example, when platform 100 takes the form of aircraft 104, resettable decompression system 102 can be installed in aircraft 104.

In this illustrative example, aircraft 104 includes crown space 108 separated from passenger cabin 110 by ceiling panel 112. Crown space 108 further includes structures 114. Structures 114 can be any number of support or structural features located in crown space 108. Ceiling panel 112 is connected to structures 114. Resettable decompression system 102 is connected to structures 114. Resettable decompression system 102 is connected to ceiling panel 112. Resettable decompression system 102 holds the ceiling panel closed which separates the passenger cabin from the crown space and provides an aesthetic appearance to the passengers in the passenger cabin of the aircraft.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

In this illustrative example, resettable decompression system 102 includes resettable decompression retainer 106 paired with slip fitting 118. Typically, more than one resettable decompression retainer 106 and slip fitting 118 pair is utilized in resettable decompression system 102.

In this illustrative example, slip fitting 118 is connected to ceiling panel 112. Slip fitting 118 includes slot 124.

In this illustrative example, resettable decompression retainer 106 includes base 120 and swing arm 122. Base 120 is pivotably 124 connected swing arm 122. Base 120 is pivotably 124 connected to swing arm 122 about axis 126. The pivotable connection between base 120 and swing arm 122 includes bias 130. For example, bias 130 may be provided by spring 132, where spring 132 is connected to base 120 and swing arm 122. Bias 130 may be provided by spring 132, a shock absorber, a gas or fluid strut, etc. where each is connected to both base 120 and swing arm 122.

In this illustrative example, base 120 includes cylinder 136 connected to platform 134. Platform 134 is generally planar and can have constant thickness 140 or non-constant thickness 142. Whether platform 134 has constant thickness 140 or non-constant thickness 142 depends on the location in the aircraft where resettable decompression system 102 is installed. Space constraints and shape of structures 114 dictates the thickness of and any angles of non-constant thickness of platform 134. Cylinder 136 surrounds axle 144. Axle 144 provides axis 126 to which swing arm 122 is pivotable with respect to base 120. Base 120 includes stop 146. Stop 146 provides a surface where swing arm 122 abuts base 120. Stop 146 may be angled edge 148 formed in platform 134. Stop 146 may be notch 150 formed in cylinder 136. Base 120 includes lag 152. Lag 152 provides a mounting point on base 120 for spring 132 or any other device providing bias 130.

In this illustrative example, swing arm 122 includes surface 154 for abutment with stop 146. Surface 154 may be crossbar 166 for contact with angled edge 148. Surface 154 may be tab 168 for contact with notch 150. Swing arm 122 includes lag 164. Lag 164 provides a mounting point on swing arm 122 for spring 132 or any other device providing bias 130. Swing arm 122 includes roller 156. Roller 156 further includes sleeve 158 and axle 160. Sleeve 158 is rotatable about axle 160, providing roller axis 162. Roller axis 162 is generally parallel with axis 126. Roller 156 slidably engages slot 124 of slip fitting 118.

Swing arm 122 is pivotable about axis 126 with respect to base 120. Because of the pivotable connection to base 120, swing arm 122 defines three positions with respect to base 120. The three positions of swing arm 122 with respect to base 120 are closed position 170, over-center position 172, and open position 174. In normal operation of aircraft 104, swing arm 122 of resettable decompression retainer 106 is in closed position 170 and ceiling panel 112 separates passenger cabin 110 from crown space 108.

If swing arm 122 is positioned anywhere between closed position 170 and over-center position 172, bias 130 forces swing arm 122 into closed position 170. When swing arm 122 is in closed position 170, surface 154 abuts stop 146. If swing arm 122 is positioned anywhere between over-center position 172 and open position 174, bias 130 forces swing arm 122 into open position 174. When in open position 174, swing arm 122, thus resettable decompression retainer 106, can be manually reset to closed position 170 without the use of tools and without repairing or replacing any frangible parts. Over-center position 172 is not a sustainable position. Bias 130 will always force swing arm 122 into closed position 170 or open position 174. Swing arm 122 cannot rest in over-center position 172.

During normal operation of the aircraft, the air pressures in the passenger cabin and the crown space are equalized. A decompression event will cause a difference in air pressures between the passenger cabin and the crown space.

During a decompression event, air pressure differences between the passenger cabin and the crown space will create a force on ceiling panel 112. Slip fitting 118, because it is attached to ceiling panel 112 and slidably engaged with swing arm 122 of resettable decompression retainer 106, will transmit the force on ceiling panel 112 to swing arm 122. If the force created by the difference in air pressure applied to the swing arm of the resettable decompression retainer is greater than bias 130, then swing arm 122 will rotate with respect to base 120 and the ceiling panel will move creating an opening between the passenger cabin and the crown space which equalizes the difference in air pressure between the two. In other words, if the force on the ceiling panel is greater than the bias holding the swing arm in a closed position with respect to the base, the swing arm rotates and an air pressure equalizing opening between the passenger cabin and the crown space forms.

Resettable decompression system 102 will allow ceiling panel 112 to move to create an opening between crown space 108 and passenger cabin 110. The opening created by resettable decompression system 102 allows the air pressures between passenger cabin 110 and crown space 108 to stabilize. After the decompression event, if the swing arm 122 has fully rotated from closed position 170 to open position 174, resettable decompression system 102 can be reset by hand to closed position 170 without the use of tools and without replacing any frangible pieces in order to get the aircraft back into service as quickly as possible.

Swing arm 122 will rotate with respect to base 120 if a force applied to the swing arm is greater than bias 130. The force may be the result of, for example, a decompression event or accidental bumping by a technician during installation or routine maintenance. If the force applied to the swing arm is less than bias 130, swing arm 122 does not rotate with respect to base 120. If the force applied to the swing arm is greater than bias 130, swing arm 122 will begin to rotate with respect to base 120. If at any time the force ceases to overcome bias 130 and the rotation of swing arm 122 with respect to base 120 from the closed position has not reached the over-center position, bias 130 will automatically force swing arm 122 back to the closed position without any manual manipulation required. If the force applied to the swing arm is greater than bias 130 and rotation of the swing arm with respect to the base moves from the closed position to beyond the over-center position, bias 130 will force the swing arm to the open position regardless of the presence or strength of the force.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
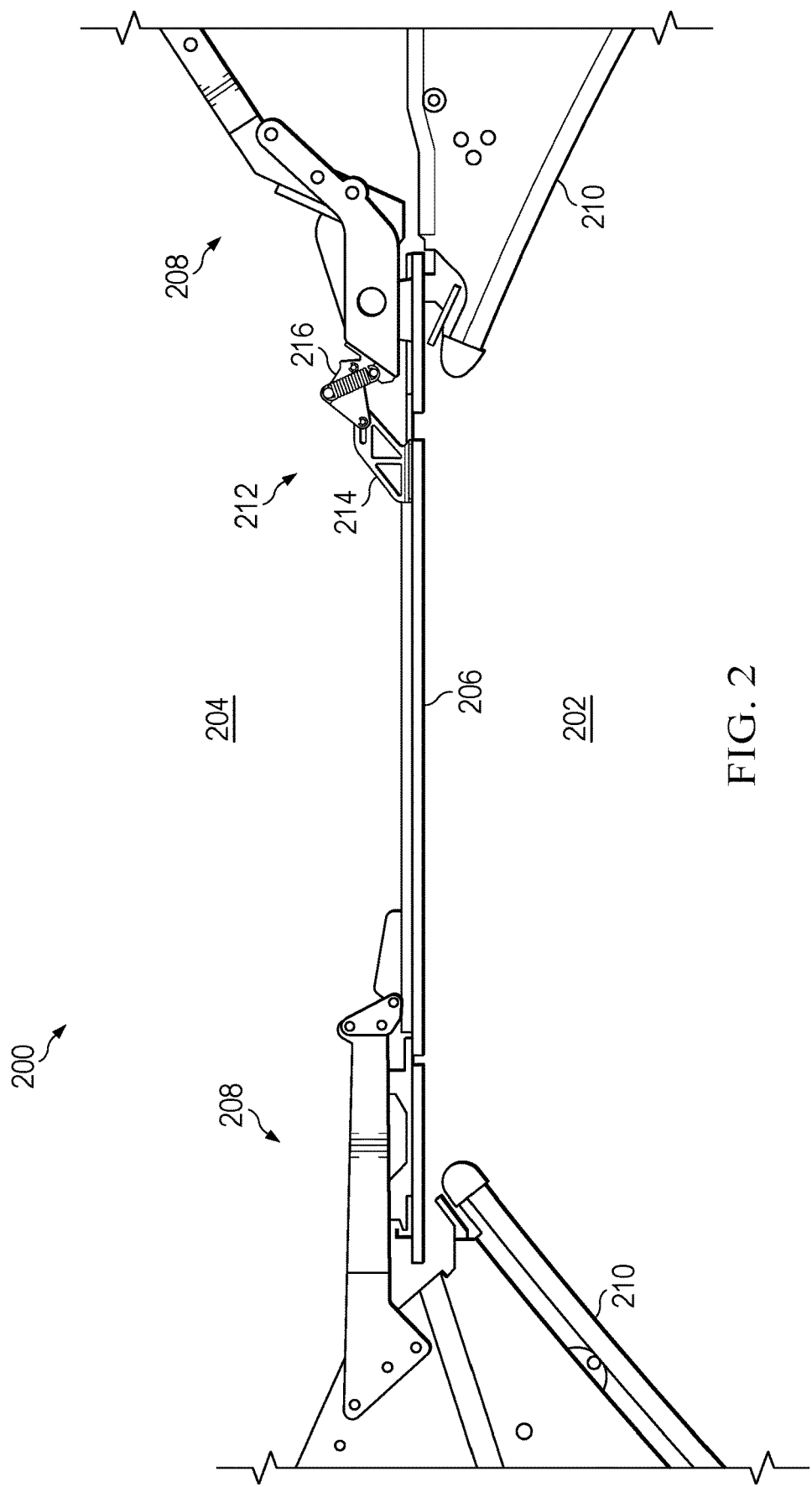
FIGS. 2-4 are illustrations of a passenger cabin and crown space of an aircraft in accordance with an illustrative example.
Figure 3:
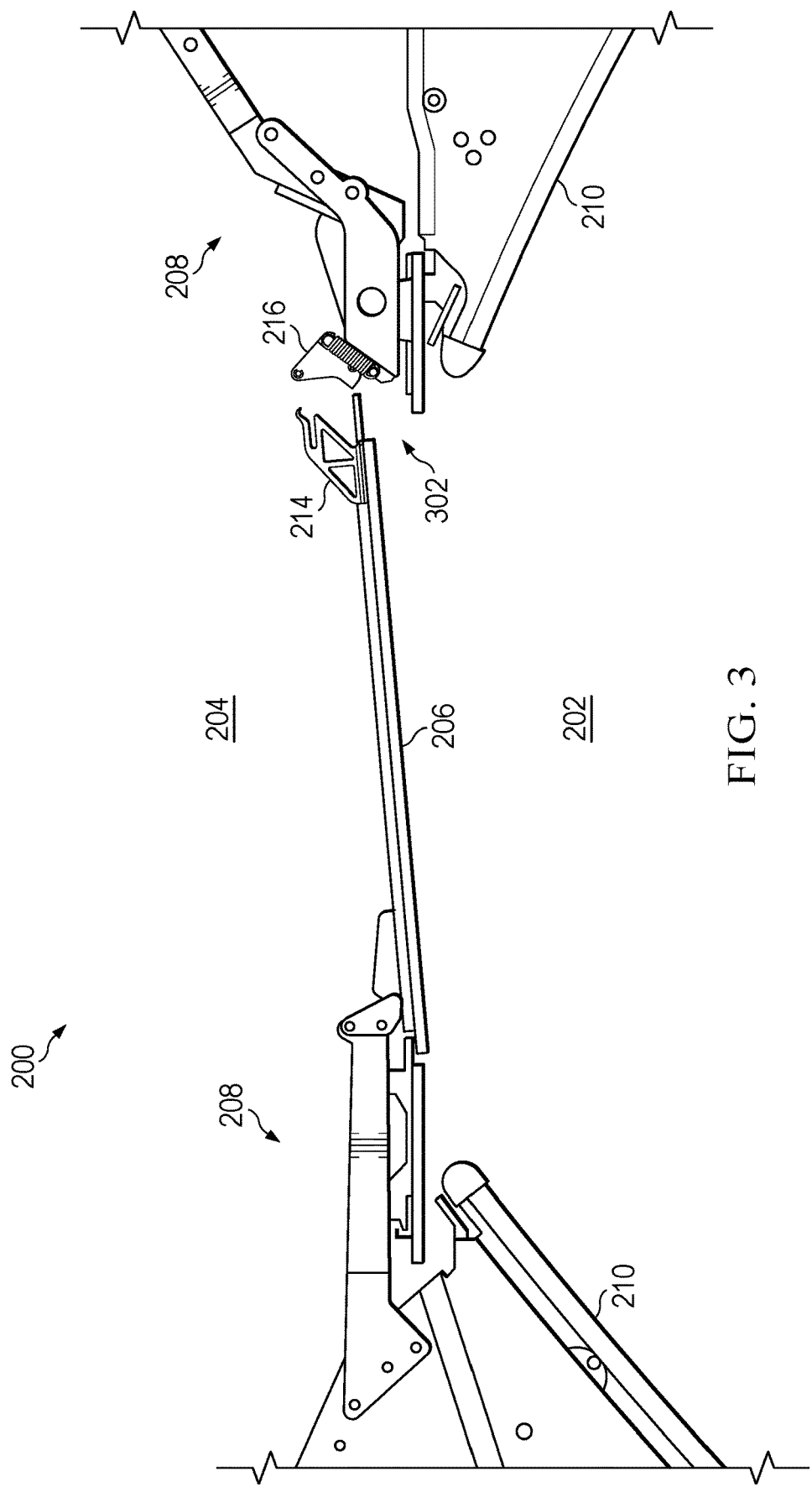
Figure 4:
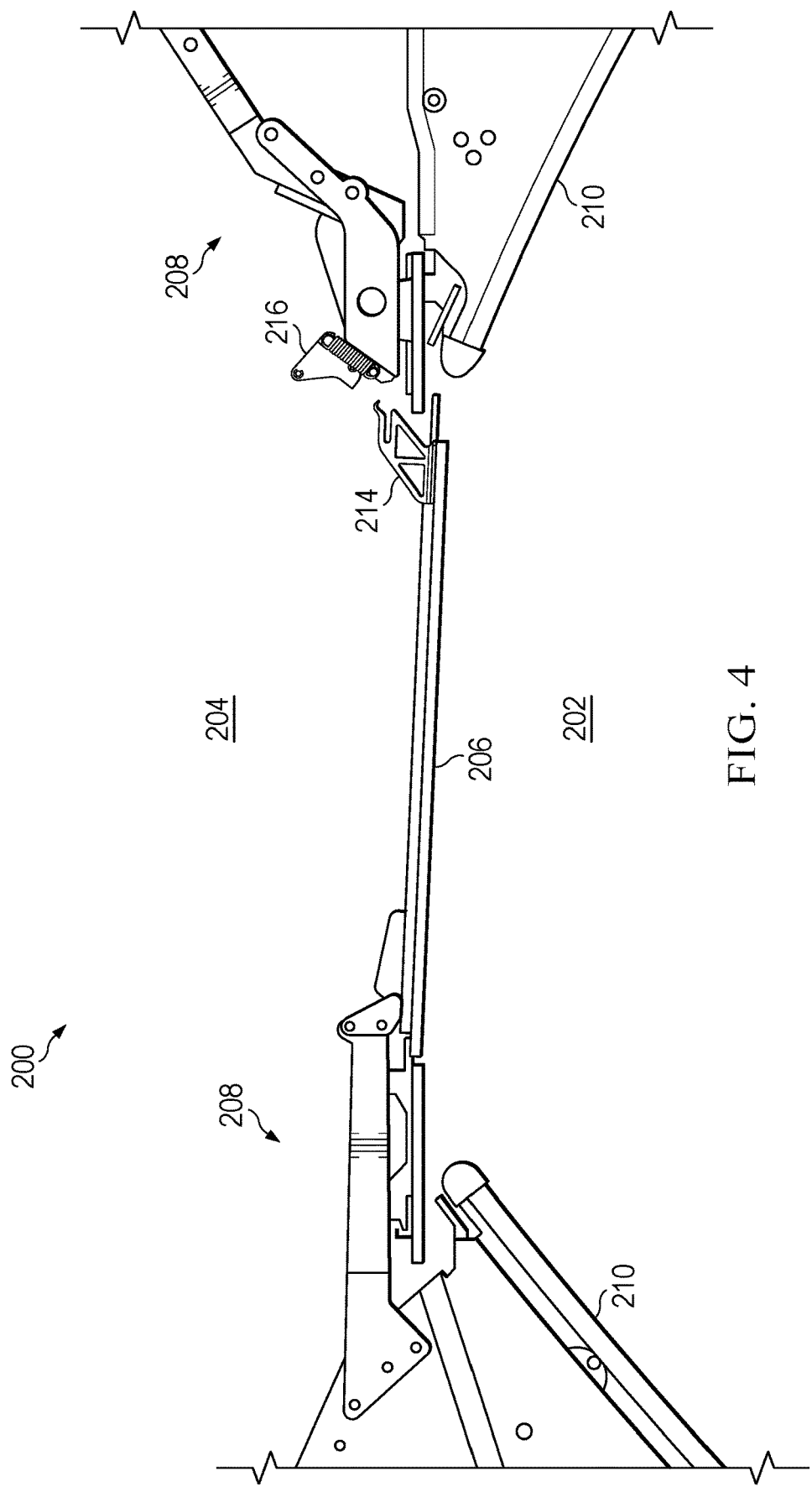

With reference next to FIGS. 2-4, illustrations of a passenger cabin and crown space of an aircraft are depicted in accordance with an illustrative example. In this illustrative example, passenger cabin 202 of aircraft 200 is separated from crown space 204 of aircraft 200 by ceiling panel 206. Structures 208 may include overhead bins 210. Resettable decompression system 212 includes slip fitting 214 and resettable decompression retainer 216. Slip fitting 214 is connected to ceiling panel 206. Resettable decompression retainer 216 is connected to structures 208. In this illustrative example, aircraft 200 is an example of one implementation for aircraft 104 shown in block form in FIG. 1.

Resettable decompression system 212 is an example of one implementation for resettable decompression system 102 shown in block form in FIG. 1.

As depicted, FIG. 2 shows resettable decompression retainer 216 in a closed position as it would be during normal operating conditions of the aircraft. Ceiling panel 206 separates passenger cabin 202 from crown space 204. There is generally no opening between passenger cabin 202 from crown space 204. A roller of resettable decompression retainer 216 is slidably engaged in a slot of slip fitting 214.

FIG. 3 depicts resettable decompression retainer 216 in an open position as it would be immediately after a decompression event created a force sufficient to overcome the bias of resettable decompression retainer 216. The force sufficient to overcome the bias of resettable decompression retainer 216 has moved ceiling panel 206 such that slip fitting 214 has rotated the swing arm of resettable decompression retainer 216 relative to the base of resettable decompression retainer 216 to the open position. As a result, opening 302 exists between passenger cabin 202 and crown space 204. Opening 302 allows the air pressure differences between passenger cabin 202 and crown space 204 resulting from the decompression event to equalize.

FIG. 4 depicts resettable decompression retainer 216 in an open position and ready to be manually reset without the use of tools or without the need to repair or replace resettable decompression retainer 216. After the air pressure differences between passenger cabin 202 and crown space 204 have been equalized, gravity forces slip fitting 214 attached to ceiling panel 206 into contact with structures 208. Slip fitting 214 in contact with structures 208 prevents ceiling panel 206 from falling into passenger cabin 202. The swing arm of the resettable decompression retainer 216 can be manually reset against the bias of resettable decompression retainer 216 into the closed position while slidably reengaging slip fitting 214 with the swing arm of resettable decompression retainer 216.

Figure 5:
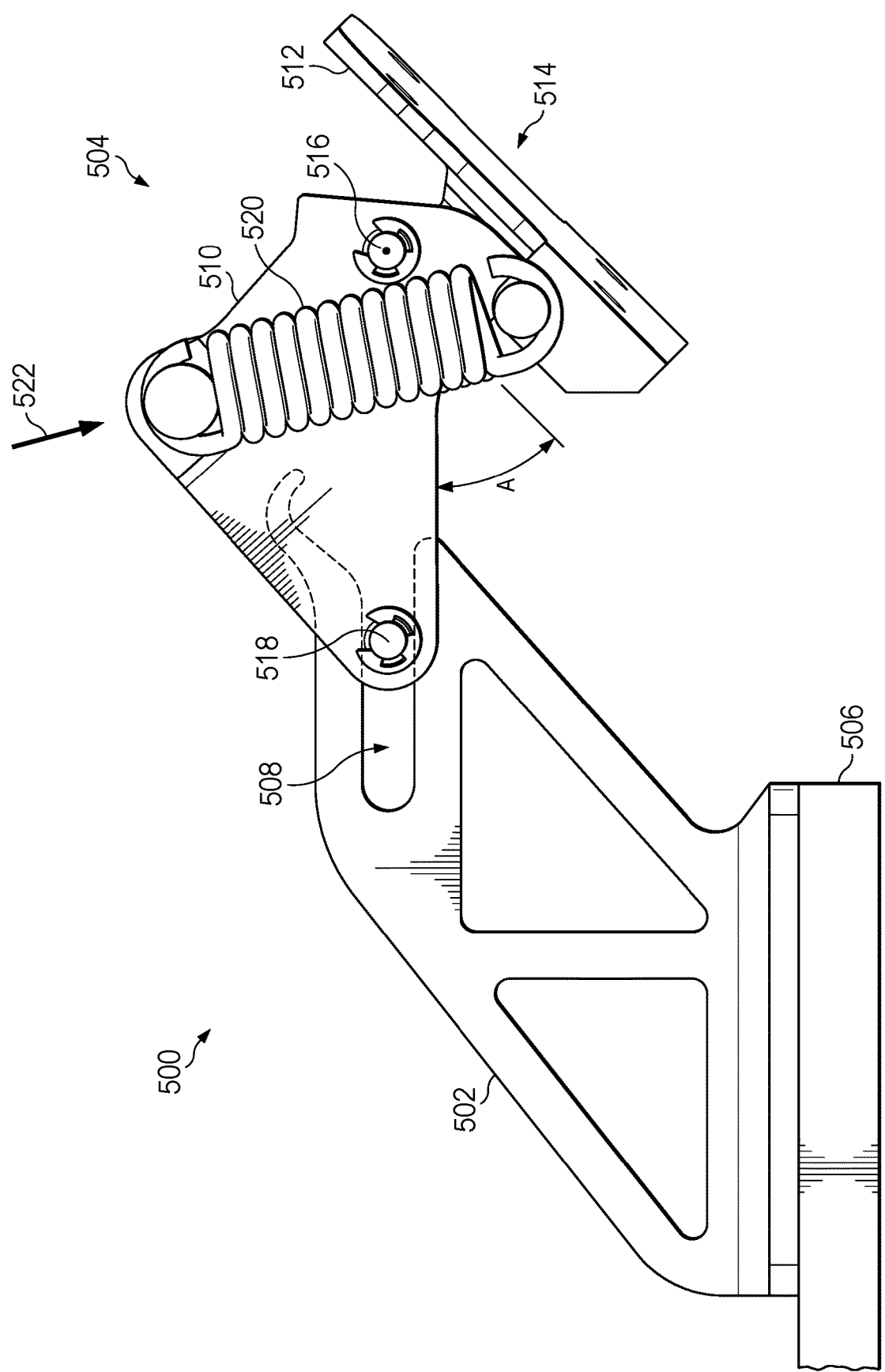
FIGS. 5-7 are illustrations of a resettable decompression system in accordance with an illustrative example.
Figure 6:
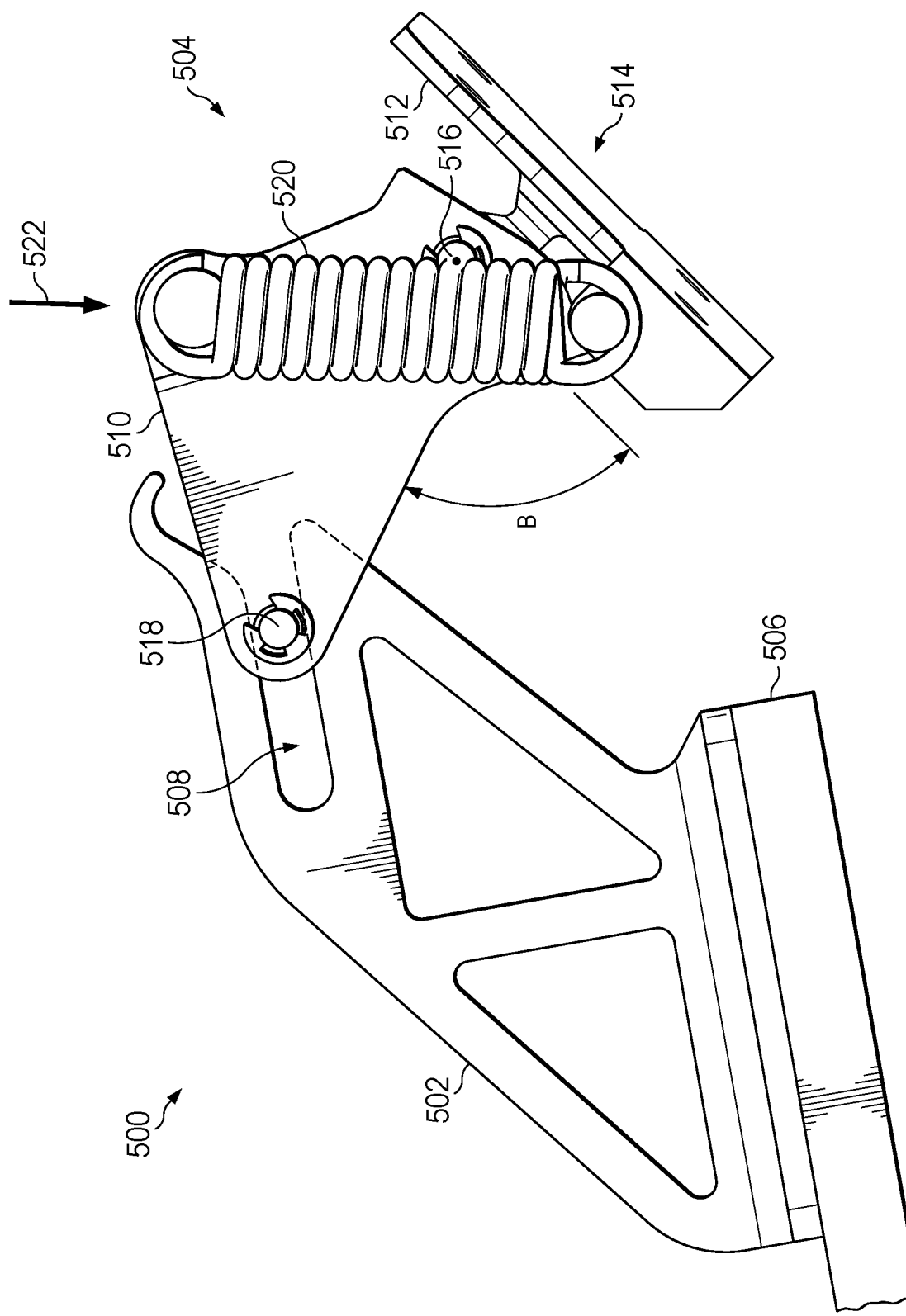
Figure 7:
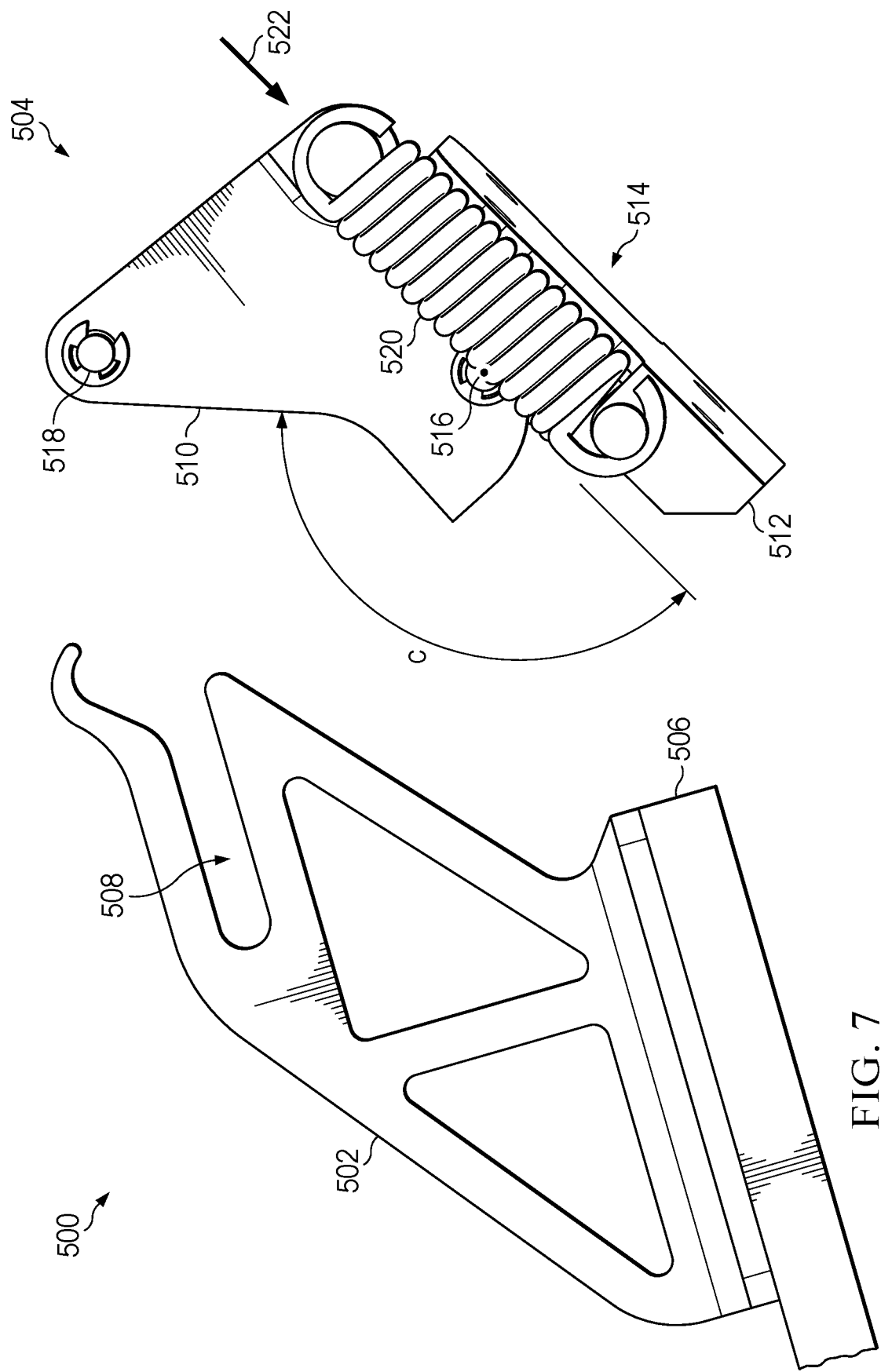

With reference next to FIGS. 5-7, illustrations of a resettable decompression system are depicted in accordance with an illustrative example. In this illustrative example, resettable decompression system 500 is an example of one implementation for resettable decompression system 102 shown in block form in FIG. 1.

In this illustrative example, resettable decompression system 500 includes slip fitting 502 and resettable decompression retainer 504. Slip fitting 502 is connected to ceiling panel 506. Slip fitting 502 includes slot 508. Resettable decompression retainer 504 includes swing arm 510 pivotably connected to base 512 about axis 516. Base 512 is connected to structures 514. Swing arm 510 includes roller 518. Spring 520 is connected to swing arm 510 and base 512. Spring 520 imparts bias 522 on swing arm 510 with respect to base 512.

FIG. 5 depicts resettable decompression retainer 504 in a closed position as it would be during normal operating conditions of the aircraft. Ceiling panel 506 separates the passenger cabin from the crown space. Roller 518 is slidably engaged in slot 508. In the closed position, angle A depicts swing arm 510 with no rotation with respect to base 512. Bias 522 urges swing arm 510 into the closed position depicted.

FIG. 6 depicts resettable decompression retainer 504 where swing arm 510 has rotated with respect to base 512 through angle B. A force, either on swing arm 510 itself or on ceiling panel 506 and transmitted to swing arm 510, sufficient to overcome bias 522, causes swing arm 510 to move from the closed position and rotate with respect to base 512.

FIG. 7 depicts resettable decompression retainer 504 in an open position as it would be after a force sufficient to overcome bias 522 has caused swing arm 510 to rotate from the closed position to beyond an over-center position. The open position of resettable decompression retainer 504 depicted in FIG. 7 shows swing arm 510 rotated with respect to base 512 through angle C.

Figure 8:
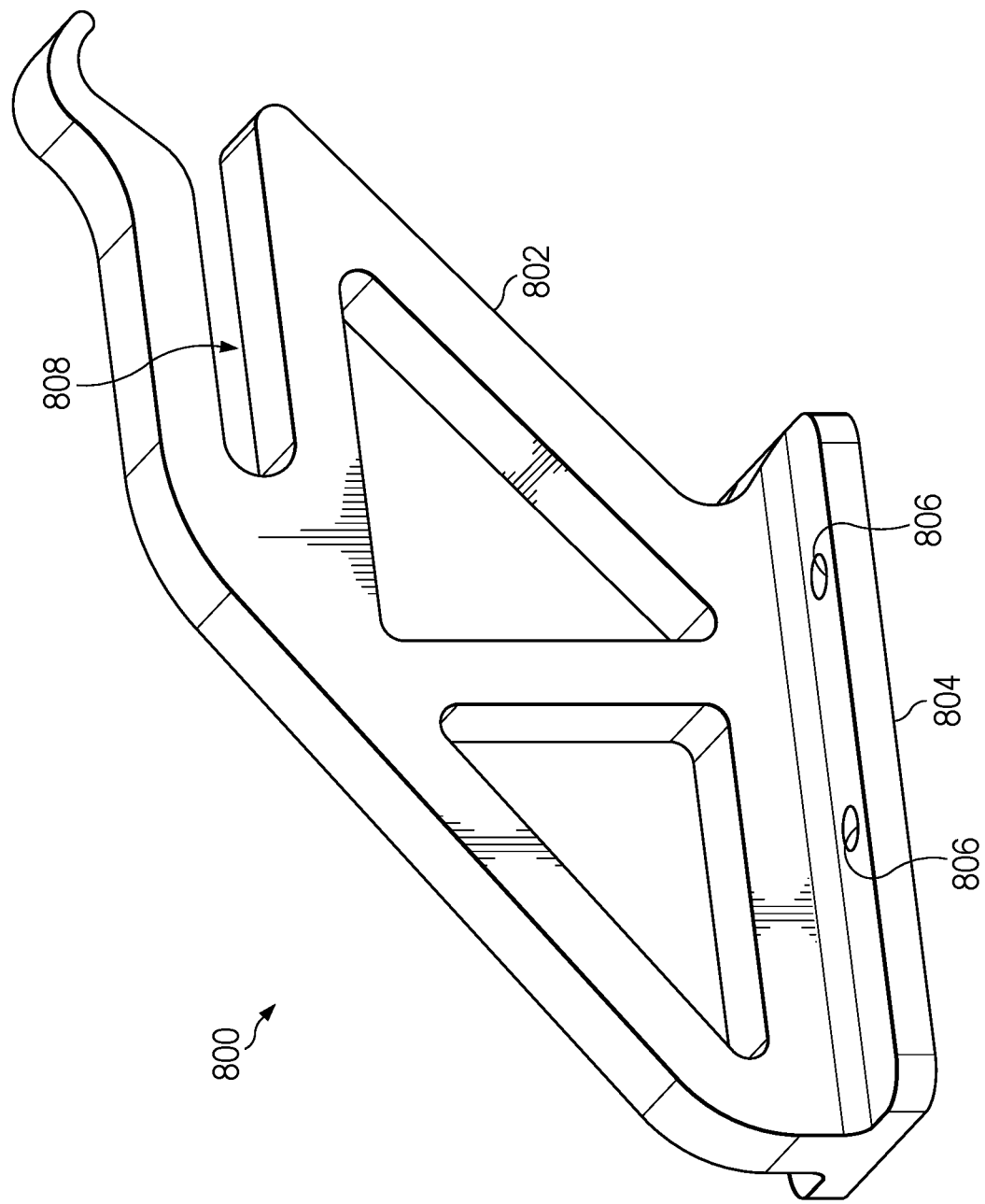
FIG. 8 is an illustration of a slip fitting in accordance with an illustrative embodiment.

With reference next to FIG. 8, illustration of a slip fitting is depicted in accordance with an illustrative example. In this illustrative example, slip fitting 800 is an example of one implementation for slip fitting 118 shown in block form in FIG. 1. In this illustrative example, slip fitting 800 is an example of one implementation for slip fitting 214 shown in FIGS. 2-4 and slip fitting 502 shown in FIGS. 5-7.

As depicted, slip fitting 800 includes body 802 extending from base 804. Base 804 includes mounting holes 806 for attaching slip fitting 800 to a ceiling panel. Body 802 defines slot 808. Slot 808 is sized to slidably receive a roller from a swing arm of a resettable decompression retainer.

Figure 9:
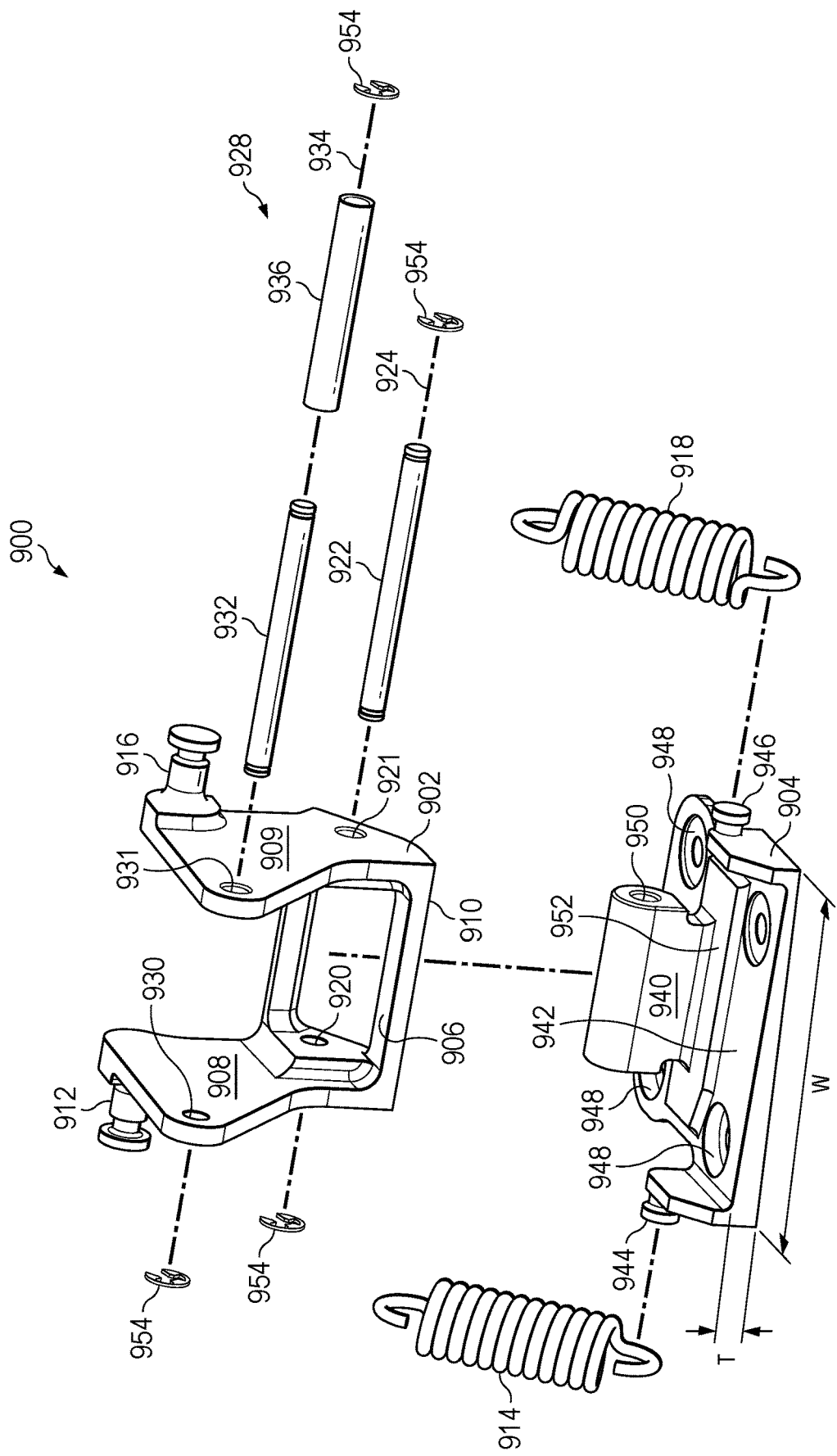
FIG. 9 is an illustration of an exploded view of a resettable decompression retainer in accordance with an illustrative embodiment.
Figure 10:
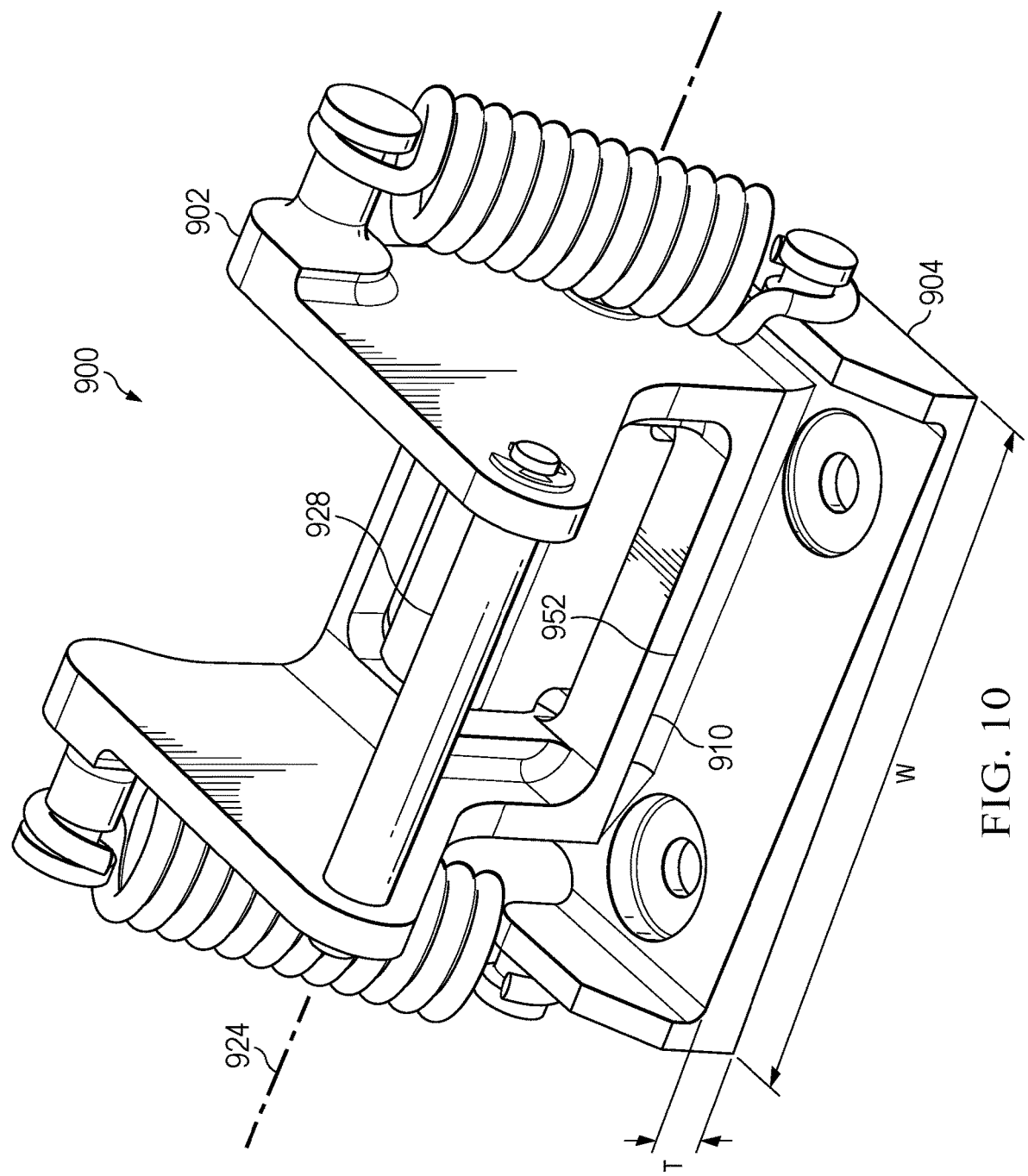
FIG. 10 is an illustration of a resettable decompression retainer in a closed position in accordance with an illustrative embodiment.
Figure 11:
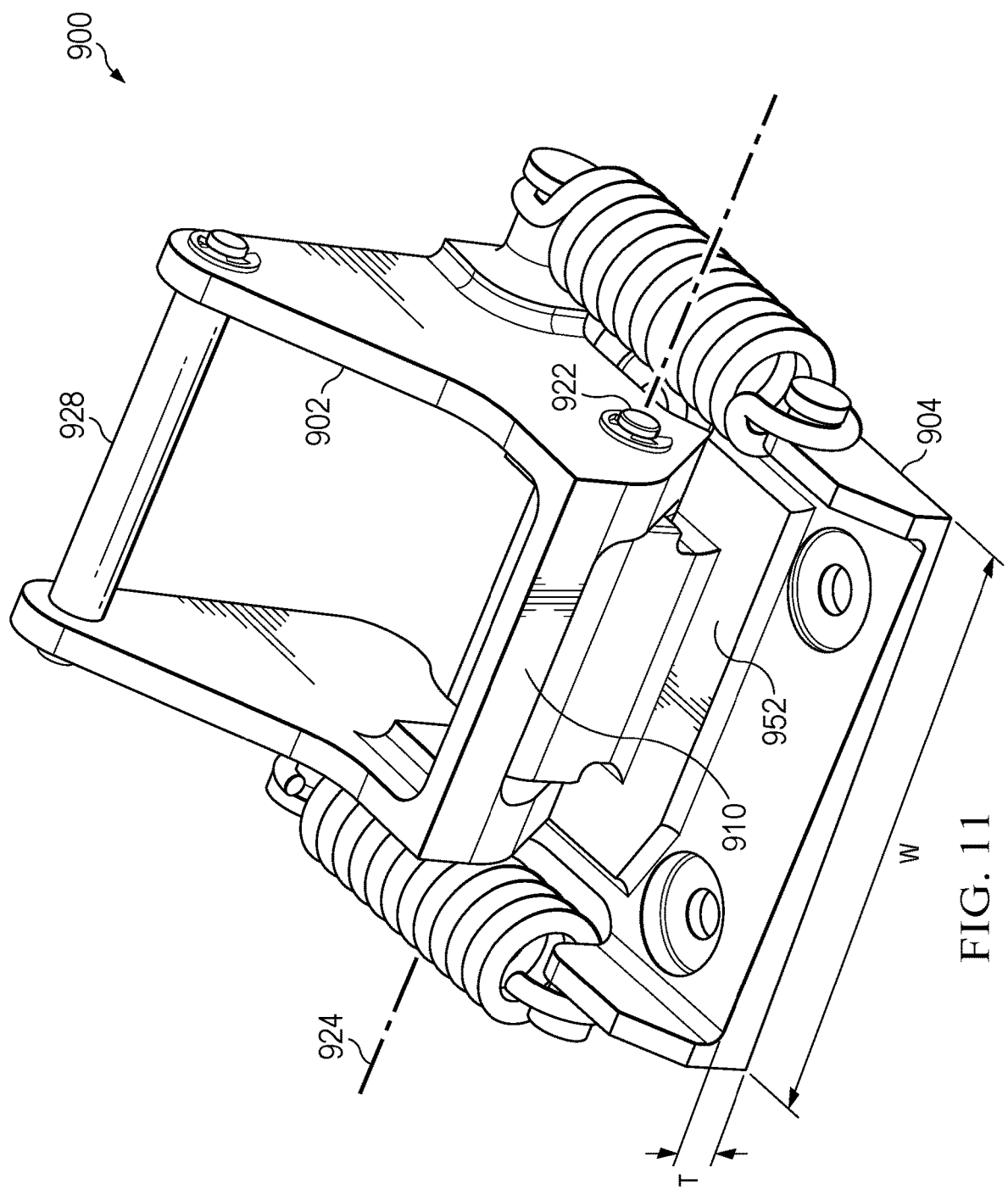
FIG. 11 is an illustration of a resettable decompression retainer in an open position in accordance with an illustrative embodiment.

With reference next to FIGS. 9-11, an illustration of components of a resettable decompression retainer is depicted in accordance with an illustrative example. In the illustrative examples, the same reference numeral may be used in more than one figure. This reuse of a reference numeral in different figures represents the same element in the different figures. The components illustrated in FIGS. 9-11 are examples of physical implementations of resettable decompression retainer 106 shown in block form in FIG. 1.

As illustrated, resettable decompression retainer 900 includes swing arm 902 pivotably connected to base 904. FIG. 9 depicts an exploded view of resettable decompression retainer 900 in a closed position. FIG. 10 depicts resettable decompression retainer 900 in a closed position. FIG. 11 depicts resettable decompression retainer 900 in an open position.

Swing arm 902 is generally "U-shaped" including crossbar 906 extending between side 908 and side 909. Crossbar 906 provides surface 910 for abutment with base 904. Side 908 includes lag 912 for attachment of spring 914. Side 909 includes lag 916 for attachment of spring 918. Side 908 and side 909 define hole 920 and hole 921 for housing axle 922. Axle 922 defines axis 924. Side 908 and side 909 define hole 930 and hole 931 for housing axle 932. Axle 932 defines roller axis 934. Sleeve 936 surrounds axle 932 and rotates with respect to axle 932 about roller axis 934 to form roller 928. Roller axis 934 is generally parallel to axis 924.

Base 904 is generally planar including cylinder 940 extending from platform 942. Platform 942 includes lag 944 for attachment of spring 914 and lag 946 for attachment of spring 918. Platform 942 includes mounting holes 948 for attachment of base 904 to aircraft structures. Platform 942 has a non-constant thickness over width W. Cylinder 940 defines opening 950 sized to receive axle 922. Platform 942 includes angled edge 952 for abutment with surface 910 of swing arm 902.

Retaining rings 954 secure axle 932 and axle 922 within resettable decompression retainer 900 to pivotably connect swing arm 902 to base 904 and to connect roller 928 to swing arm 902. Swing arm 902 is rotatable with respect to base 904 about axis 924. Sleeve 936 of roller 928 is rotatable with respect to axle 932 about roller axis 934.

Figure 12:
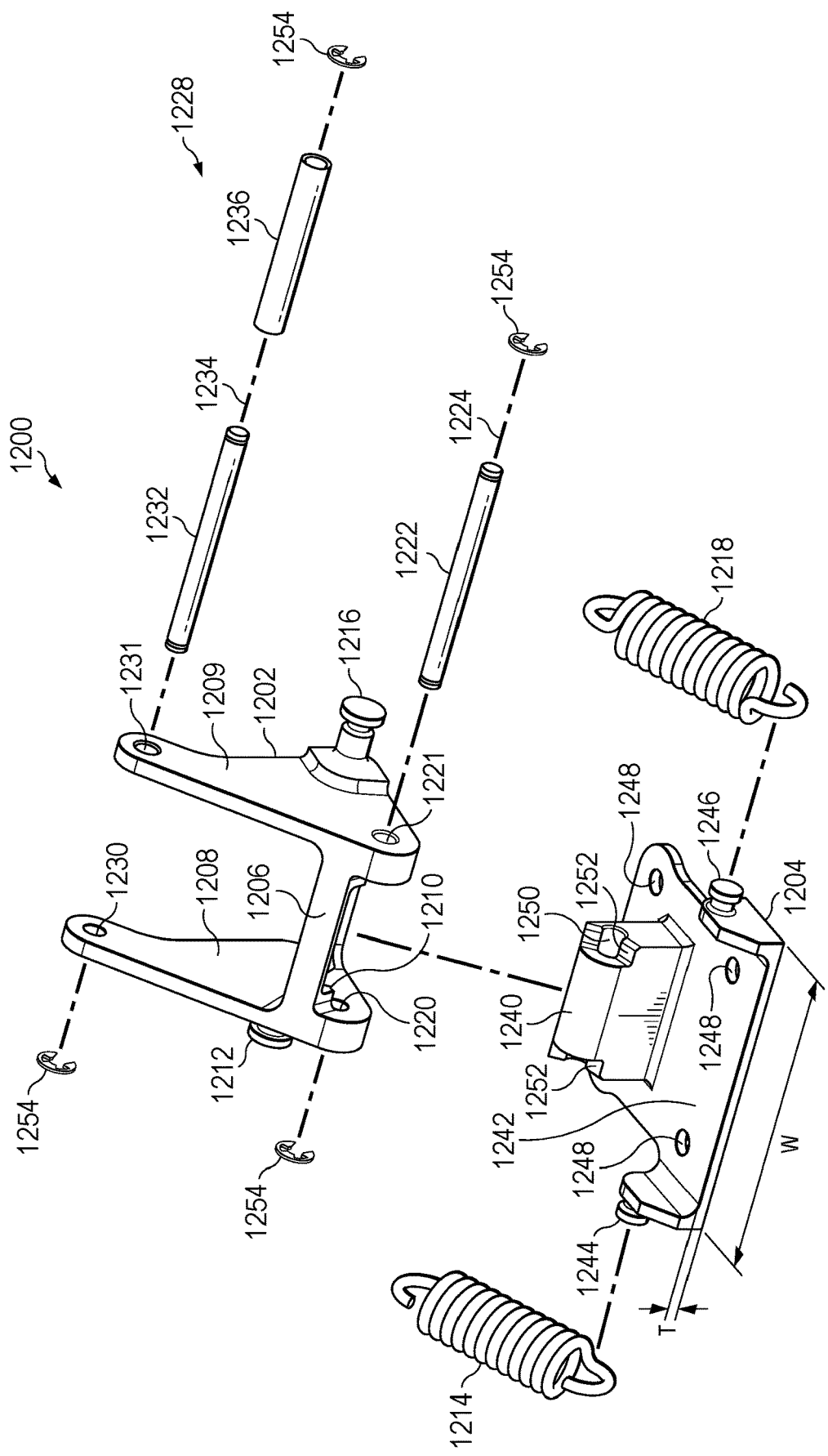
FIG. 12 is an illustration of an exploded view of a resettable decompression retainer in accordance with an illustrative embodiment.
Figure 13:
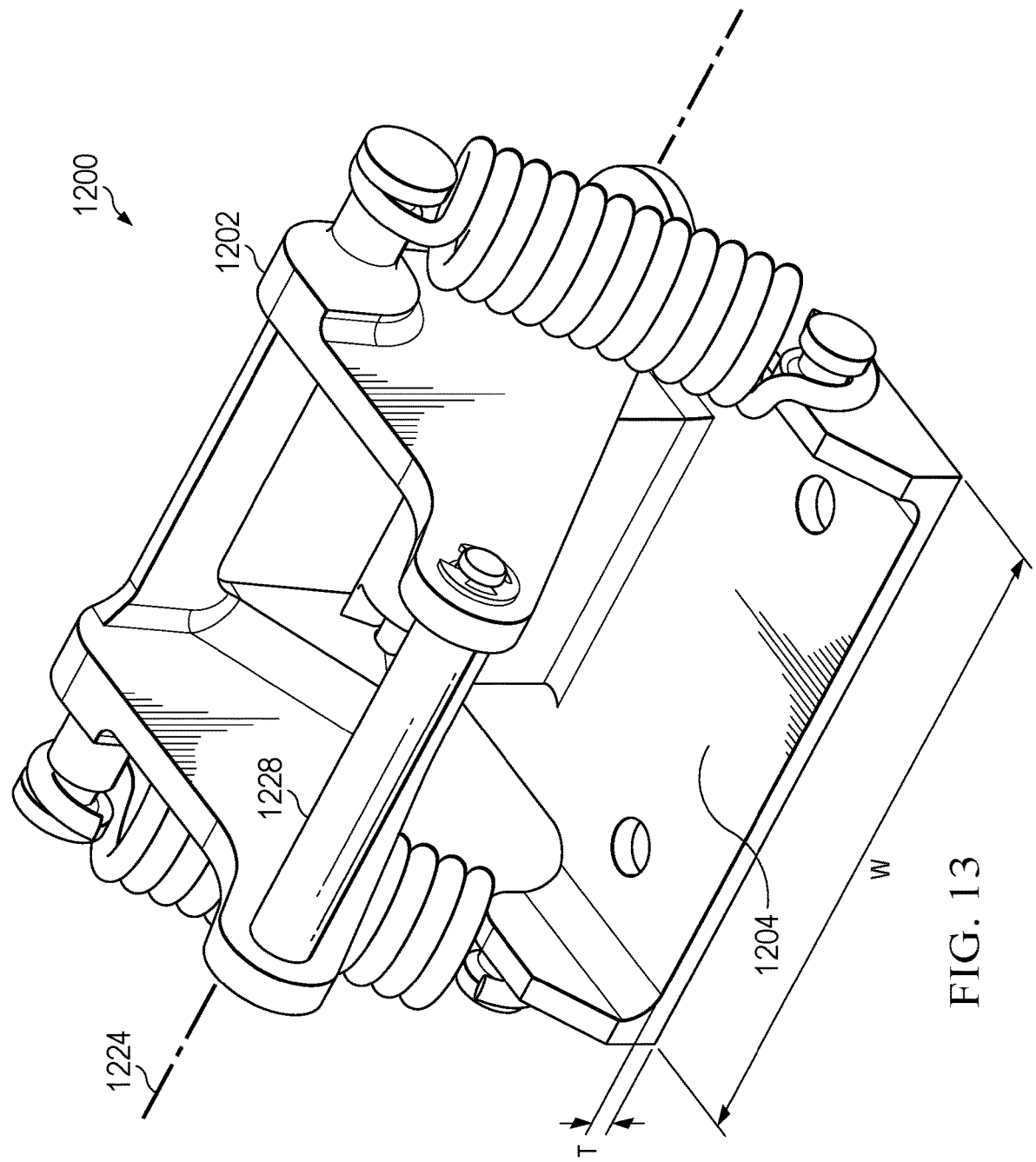
FIG. 13 is an illustration of a resettable decompression retainer in a closed position in accordance with an illustrative embodiment.
Figure 14:
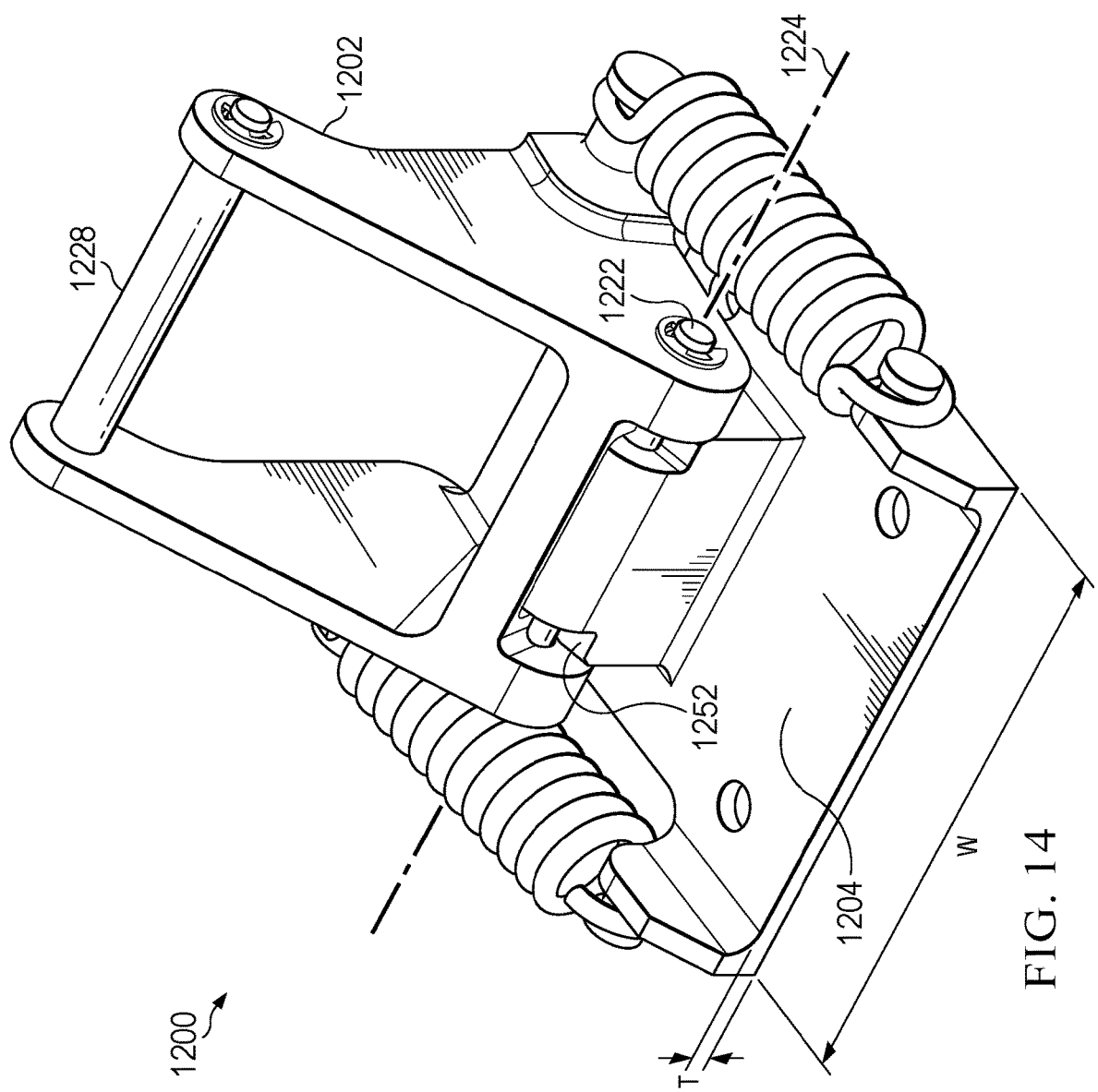
FIG. 14 is an illustration of a resettable decompression retainer in an open position in accordance with an illustrative embodiment.

With reference next to FIGS. 12-14, an illustration of components of a resettable decompression retainer is depicted in accordance with an illustrative example. In the illustrative examples, the same reference numeral may be used in more than one figure. This reuse of a reference numeral in different figures represents the same element in the different figures. The components illustrated in FIGS. 12-14 are examples of physical implementations of resettable decompression retainer 106 shown in block form in FIG. 1.

As illustrated, resettable decompression retainer 1200 includes swing arm 1202 pivotably connected to base 1204. FIG. 12 depicts an exploded view of resettable decompression retainer 1200 in an open position. FIG. 13 depicts resettable decompression retainer 1200 in a closed position. FIG. 14 depicts resettable decompression retainer 1200 in an open position.

Swing arm 1202 is generally "U-shaped" including crossbar 1206 extending between side 1208 and side 1209. Crossbar 1206 includes tab 1210 for abutment with base 1204. Side 1208 includes lag 1212 for attachment of spring 1214. Side 1209 includes lag 1216 for attachment of spring 1218. Side 1208 and side 1209 define hole 1220 and hole 1221 for housing axle 1222. Axle 1222 defines axis 1224. Side 1208 and side 1209 define hole 1230 and hole 1231 for housing axle 1232. Axle 1232 defines roller axis 1234. Sleeve 1236 surrounds axle 1232 and rotates with respect to axle 1232 about roller axis 1234 to form roller 1228. Roller axis 1234 is generally parallel to axis 1224.

Base 1204 is generally planar including cylinder 1240 extending from platform 1242. Platform 1242 includes lag 1244 for attachment of spring 1214 and lag 1246 for attachment of spring 1218. Platform 1242 includes mounting holes 1248 for attachment of base 1204 to aircraft structures. Platform 1242 has a constant thickness T over width W. Cylinder 1240 defines opening 1250 sized to receive axle 1222. Cylinder 1240 includes notch 1252 for abutment with tab 1210 of swing arm 1202.

Retaining rings 1254 secure axle 1232 and axle 1222 within resettable decompression retainer 1200 to pivotably connect swing arm 1202 to base 1204 and to connect roller 1228 to swing arm 1202. Swing arm 1202 is rotatable with respect to base 1204 about axis 1224. Sleeve 1236 of roller 1228 is rotatable with respect to axle 1232 about roller axis 1234.

Figure 15:
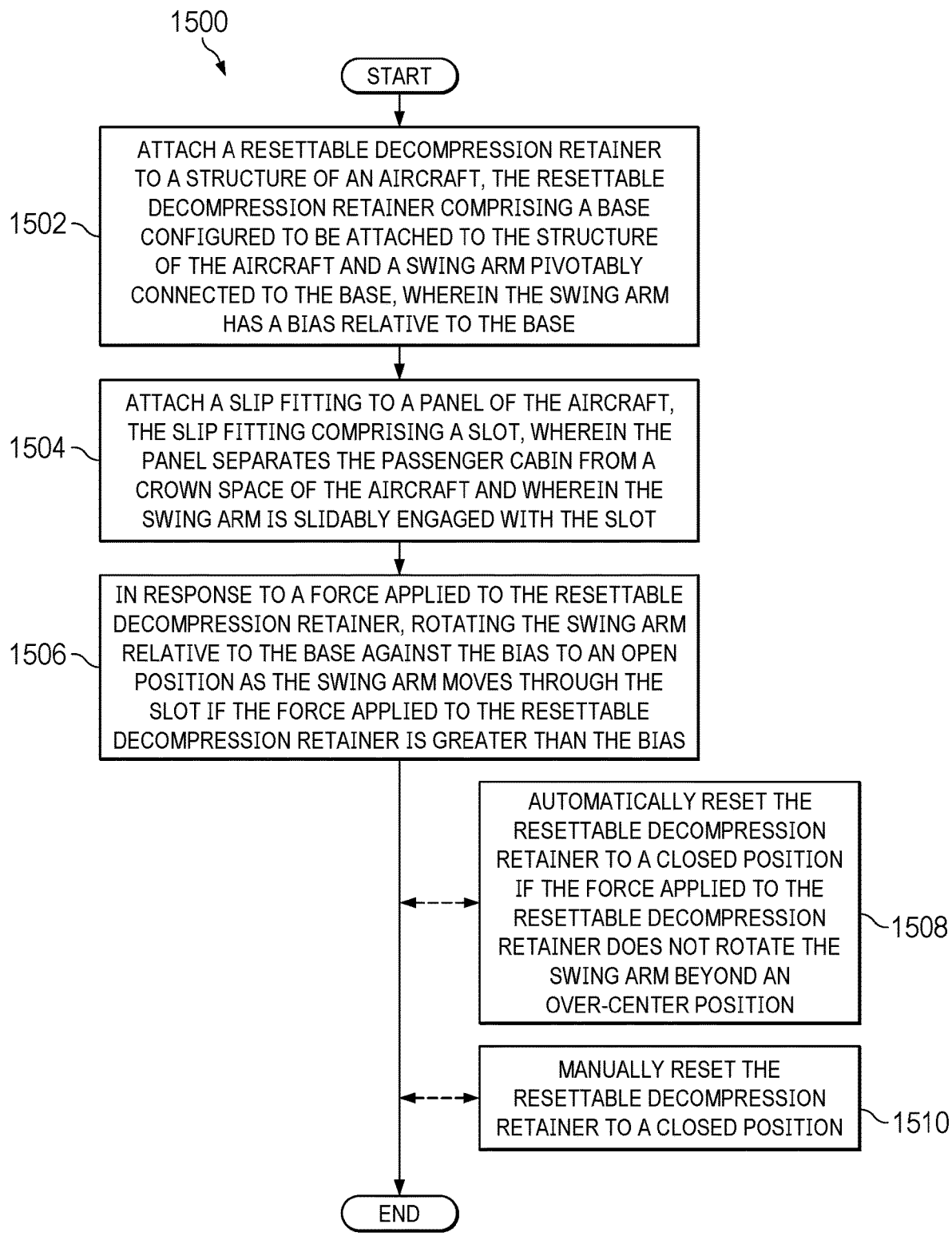
FIG. 15 is an illustration of a flowchart of a process for relieving pressure from a passenger cabin of an aircraft during a decompression event in accordance with an illustrative embodiment.

With reference next to FIG. 15, an illustration of a flowchart of a process 1500 for relieving pressure from a passenger cabin of an aircraft during a decompression event. The method depicted in FIG. 15 may be used in conjunction with resettable decompression retainer depicted in FIGS. 1-14.

The process begins by attaching a resettable decompression retainer to a structure of an aircraft (operation 1502). The resettable decompression retainer comprises a base configured to be attached to the structure of the aircraft and a swing arm pivotably connected to the base. The swing arm has a bias relative to the base. The process attaches a slip fitting to a panel of the aircraft (operation 1504). The slip fitting comprises a slot. The panel separates the passenger cabin from a crown space of the aircraft and the swing arm is slidably engaged with the slot. In response to a force applied to the resettable decompression retainer, the process continues by rotating the swing arm relative to the base against the bias to an open position as the swing arm moves through the slot if the force applied to the resettable decompression retainer is greater than the bias (operation 1506).

The process may automatically reset the resettable decompression retainer to a closed position if the force applied to the resettable decompression retainer does not rotate the swing arm beyond an over-center position (operation 1508). Automatically resetting the resettable decompression retainer to a closed position occurs without any manual intervention. The bias returns the resettable decompression retainer to a closed position if the rotation of the swing arm has not progressed beyond an over-center position of the swing arm relative to the base. The process may include manually resetting the resettable decompression retainer to a closed position (operation 1510). Manually resetting the resettable decompression retainer to a closed position does not require the use of tools and does not require repairing or replacing any frangible parts.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
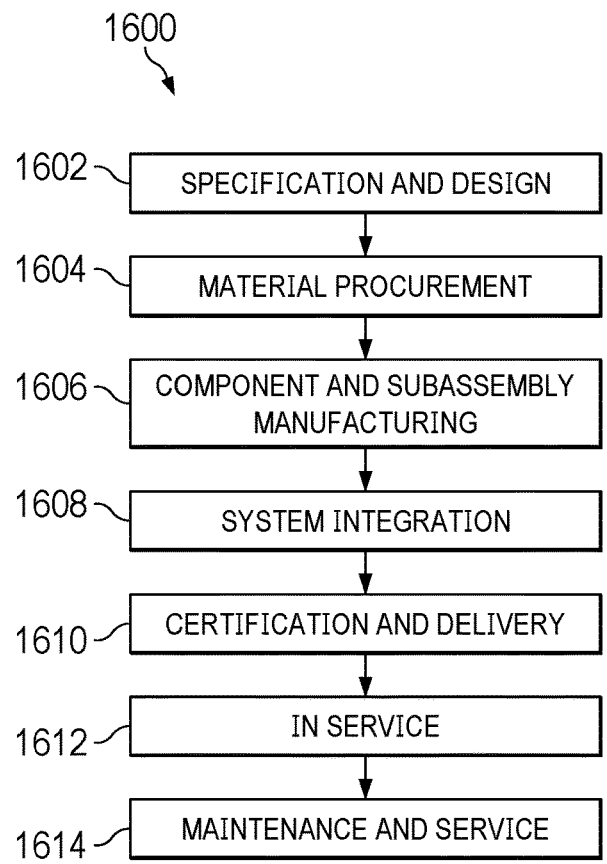
FIG. 16 is an illustration of a block diagram of an aircraft manufacturing and service method in accordance with an illustrative embodiment.
Figure 17:
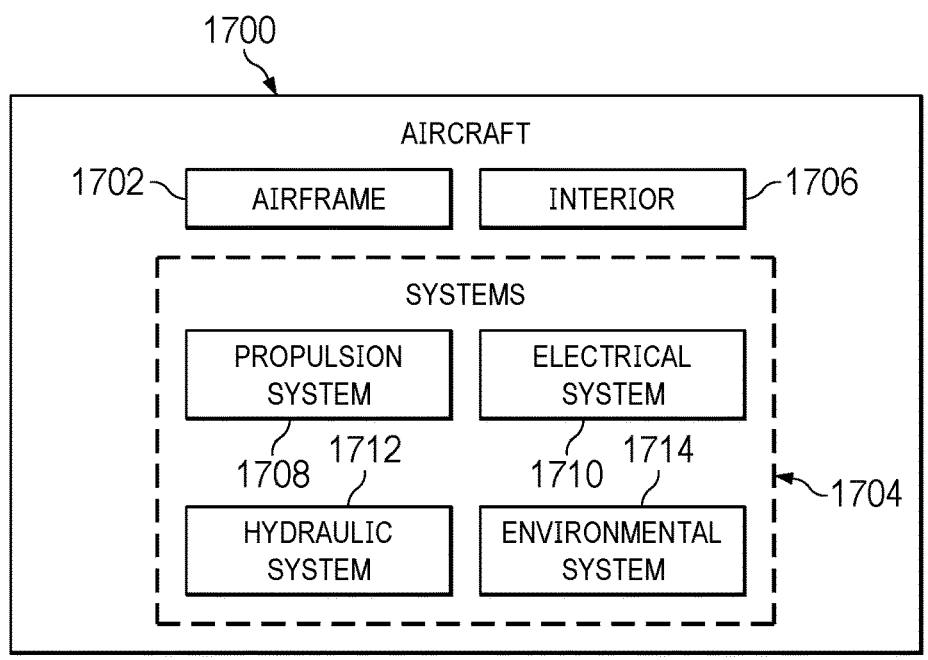
FIG. 17 is an illustration of a block diagram of an aircraft in which an illustrative embodiment may be implemented.

The illustrative embodiments of the disclosure may be further described in the context of aircraft manufacturing and service method 1600 as shown in FIG. 16 and aircraft 1700 as shown in FIG. 17. Turning first to FIG. 16, an illustration of a block diagram of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance, service, or inspection.

Resettable decompression system 102 may be installed on an aircraft during component and subassembly manufacturing 1606. In addition, Resettable decompression system 102 may be retrofitted onto aircraft 1700 in FIG. 17 during routine maintenance and service 1614 as part of a modification, reconfiguration, or refurbishment of aircraft 1700 in FIG. 17.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 17, an illustration of a block diagram of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614, inclusive of inspection, in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A resettable decompression retainer, comprising:
    a base;
    a swing arm connected to the base, the swing arm pivotable with respect to the base about an axis;
    a surface of the swing arm abuts a stop formed in the base when the swing arm is in a closed position, wherein the swing arm has a bias relative to the base;
    the swing arm having an over-center position and an open position, wherein the bias moves the swing arm into the closed position when the swing arm is positioned between the over-center position and the closed position; and
    wherein the swing arm comprises a roller, the roller rotatable about a roller axis, the roller axis spaced from and parallel to the axis.

2. The resettable decompression retainer of claim 1, wherein the bias of the swing arm moves the swing arm into the open position when the swing arm is positioned between the over-center position and the open position.

3. The resettable decompression retainer of claim 1, wherein the base comprises a cylinder surrounding the axis and the stop is a notch in the cylinder.

4. The resettable decompression retainer of claim 1, wherein the base comprises a platform and the stop is an angled edge of the platform.

5. The resettable decompression retainer of claim 1, wherein the bias is provided by a spring attached to both the swing arm and the base.

6. The resettable decompression retainer of claim 1, wherein the base is configured to be attached to a structure of an aircraft and wherein the roller of the swing arm slidably engages a slip fitting, the slip fitting configured to be attached to a panel of the aircraft.

7. The resettable decompression retainer of claim 1, wherein the bias maintains the swing arm in the closed position until a force sufficient to overcome the bias is applied to the swing arm.

8. The resettable decompression retainer of claim 1, wherein the roller comprises a sleeve surrounding the roller axis.

9. The resettable decompression retainer of claim 1, wherein the bias is provided by one of a spring, a shock absorber, and a gas or fluid strut.

10. A resettable decompression system for relieving pressure in an aircraft passenger cabin during a decompression event, comprising:
    a panel separating a crown space of an aircraft from the aircraft passenger cabin;
    a slip fitting attached to the panel, the slip fitting comprising a slot;
    a resettable decompression retainer attached to a structure of the aircraft, the resettable decompression retainer comprising:
        a base pivotally connected to a swing arm, wherein the swing arm has a bias that biases the swing arm relative to the base;
        the swing arm having a closed position, an over-center position, and an open position relative to the base, wherein the bias forces the swing arm to the closed position when the swing arm is between the closed position and the over-center position and the bias forces the swing arm to the open position when the swing arm is between the over-center position and the open position; and
        a roller formed in the swing arm and slidably engaged with the slot.

11. The resettable decompression system of claim 10, wherein the roller is engaged with the slot when the resettable decompression retainer is in the closed position and when the resettable decompression retainer is in the over-center position.

12. The resettable decompression system of claim 10, wherein a surface of the swing arm abuts a stop formed in the base when the swing arm is in the closed position.

13. The resettable decompression system of claim 12, wherein the base comprises a platform and the stop is an angled edge of the platform.

14. The resettable decompression system of claim 12, wherein the swing arm is pivotable with respect to the base about an axis and wherein the base comprises a cylinder surrounding the axis and the stop is a notch in the cylinder.

15. The resettable decompression system of claim 10, wherein the bias is provided by a spring attached to both the swing arm and the base.

16. The resettable decompression system of claim 10, wherein the bias is provided by one of a spring, a shock absorber, and a gas or fluid strut.

17. The resettable decompression system of claim 14, wherein the roller rotates about a roller axis, the roller axis is spaced from and parallel to the axis.

18. A method for relieving pressure from a passenger cabin of an aircraft during a decompression event, the method comprising:
    attaching a resettable decompression retainer to a structure of the aircraft, the resettable decompression retainer comprising a base configured to be attached to the structure of the aircraft and a swing arm pivotably connected to the base, wherein the swing arm has a closed position, an over-center position, and an open position relative to the base, wherein the swing arm has a bias relative to the base and the bias forces the swing arm to the closed position when the swing arm is between the closed position and the over-center position;

attaching a slip fitting to a panel of the aircraft, the slip fitting comprising a slot, wherein the panel separates the passenger cabin from a crown space of the aircraft and wherein a roller of the swing arm is slidably engaged with the slot; and in response to a force applied to the resettable decompression retainer, rotating the swing arm relative to the base against the bias to the open position as the roller moves through the slot if the force applied to the resettable decompression retainer is greater than the bias.

19. The method of claim 18 further comprising:

automatically resetting the resettable decompression retainer to the closed position if the force applied to the resettable decompression retainer does not rotate the swing arm beyond the over-center position.

20. The method of claim 18, wherein the bias is provided by a spring attached to both the swing arm and the base.

\* \* \* \* \*